United States Patent
Girola et al.

(10) Patent No.: US 7,339,911 B2
(45) Date of Patent: Mar. 4, 2008

(54) SELECTION BETWEEN TWO DIFFERENT CODING SCHEMES AND CORRESPONDING MODULATION SCHEMES ACCORDING TO THE ALLOWABLE TRANSMISSION DELAY OF THE DATA

(75) Inventors: Giovanna Girola, Lecco (IT);
Giovanni Paltenghi, Villongo (IT);
Costantino Volpe, Bari (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 291 days.

(21) Appl. No.: 10/524,069

(22) PCT Filed: Jul. 21, 2003

(86) PCT No.: PCT/IB03/03298
§ 371 (c)(1),
(2), (4) Date: Feb. 9, 2005

(87) PCT Pub. No.: WO2004/017554
PCT Pub. Date: Feb. 26, 2004

(65) Prior Publication Data
US 2005/0281229 A1    Dec. 22, 2005

(30) Foreign Application Priority Data
Aug. 14, 2002   (EP)   .................................. 02078364

(51) Int. Cl.
*H04B 7/216*    (2006.01)
(52) U.S. Cl. ...................... 370/335; 320/208; 320/328; 320/334
(58) Field of Classification Search ............... 370/335, 370/204–208, 252, 328–329, 337, 343–345, 370/347, 441–445, 428, 411–419, 260–261, 370/295, 340, 480–488, 298, 394; 455/452.2, 455/422.1, 450, 452.1, 509, 522, 67.13, 492.11–492.2; 375/267, 279–280, 298–299, 308, 329, 331, 375/340–341, 260, 295
See application file for complete search history.

(56) References Cited

U.S. PATENT DOCUMENTS 6,167,031 A  *  12/2000  Olofsson et al. ............ 370/252

(Continued)

FOREIGN PATENT DOCUMENTS

WO    WO010836 A1    2/2001

OTHER PUBLICATIONS

Peter S. Chow et al. A Pratical Disctete Multitone Transceiver Loading Algorithm for Data Transmission Over Spectrally Shaped Channels, IEEE Transactions on Communications, Feb. and Apr. 1995, p. 773-775.

(Continued)

*Primary Examiner*—Pablo N. Tran
(74) *Attorney, Agent, or Firm*—Paul Im

(57) ABSTRACT

Transmitters comprising detectors (32) for detecting packet data to be transmitted are provided with selectors (34) for in response to detection results of real-time requirements selecting first coding schemes and first modulation schemes like convolutional codes and adaptive orthogonal frequency division modulation schemes and for in response to non-real-time requirements selecting second coding schemes and second modulation schemes like turbo codes and orthogonal frequency division modulation schemes, to transmit with increased efficiency. Further detection results comprise target bit error rates and/or a payload bit rates, and further detectors (33) detect channel conditions. A processor system (20) runs adaptive algorithms for evaluating a maximum available bit rate in dependence of said channel conditions and/or margin adaptive algorithms for computing a bit loading in dependence of an actual bit rate. A code rate adapter (35) adapts code rates for said computing, and a generator (36) generates code rates and/or block lengths and/or numbers of iterations and/or code parameters.

11 Claims, 2 Drawing Sheets

Fig. 3

U.S. PATENT DOCUMENTS

Figure 1:
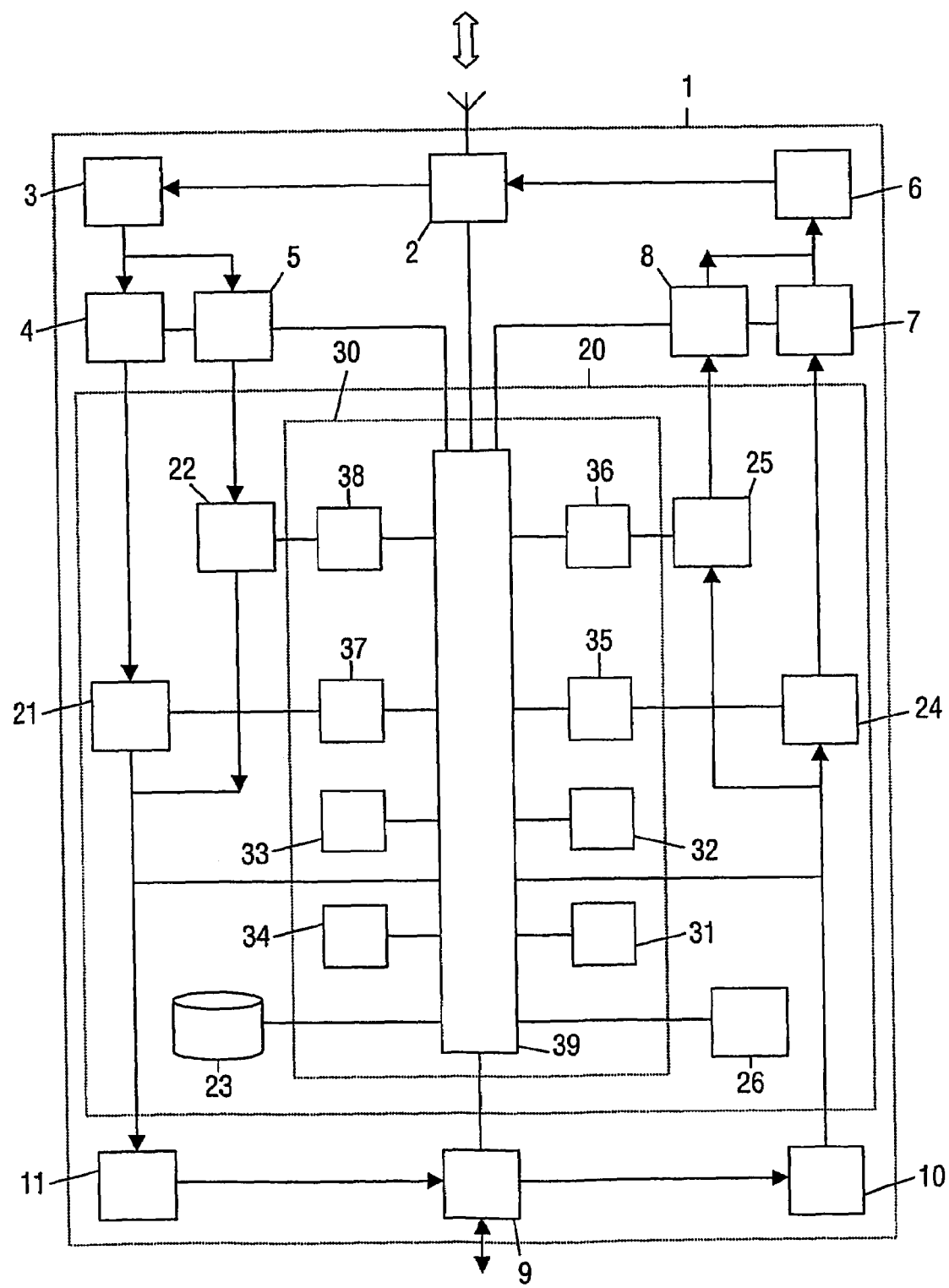

| | | | |
|---|---|---|---|
| 6,212,240 B1 * | 4/2001 | Scheibel et al. | 375/261 |
| 6,215,827 B1 * | 4/2001 | Balachandran et al. | 375/262 |
| 6,377,548 B1 * | 4/2002 | Chuah | 370/233 |
| 6,430,228 B1 * | 8/2002 | Zhang | 375/261 |
| 6,567,416 B1 * | 5/2003 | Chuah | 370/418 |
| 6,614,861 B1 * | 9/2003 | Terry et al. | 375/347 |
| 6,889,355 B1 * | 5/2005 | Calderbank et al. | 714/792 |
| 6,999,432 B2 * | 2/2006 | Zhang et al. | 370/328 |
| 7,016,296 B2 * | 3/2006 | Hartman, Jr. | 370/204 |
| 2001/0010687 A1 | 8/2001 | Lee et al. | |
| 2002/0054578 A1 | 5/2002 | Zhang et al. | |
| 2002/0075830 A1 | 6/2002 | Hartman | |

OTHER PUBLICATIONS

Ki-Ho Lee et al. Radio Link Control Protocol for WCDMA Based Mobile Satellite Communication System, IEEE, 2002. p. 1854-1858.

Curt Schurgers et al. Model of Loaded Multicarrier Systems for Simulation and Channel State Aware Protoco.XP-002252237, TM-UCLA-NESL-2001-01-03. p. 1-15.

* cited by examiner

SELECTION BETWEEN TWO DIFFERENT CODING SCHEMES AND CORRESPONDING MODULATION SCHEMES ACCORDING TO THE ALLOWABLE TRANSMISSION DELAY OF THE DATA

The invention relates to a transmitter for transmitting packet data and comprising a detector for detecting packet data to be transmitted.

The invention also relates to a processor system for use in a transmitter for transmitting packet data and comprising a detector for detecting packet data to be transmitted, and to a method for transmitting packet data and comprising the step of detecting packet data to be transmitted, and to a processor program product for use in a transmitter for transmitting packet data and comprising the function of detecting packet data to be transmitted.

Such a transmitter forms for example part of a transceiver for transmitting and receiving packet data, which transceiver for example forms part of a mobile phone or a base station or a node or a wireless local area network or a wireless unit etc.

A prior art method for transmitting packet data is known from US 2001/0010687, which discloses the detecting of a service option of a packet and in response allocating a control channel or a traffic channel for said transmitting.

The known transmitter is disadvantageous, inter alia, due to not using channels efficiently.

It is an object of the invention, inter alia, of providing a transmitter as defined in the preamble which uses channels more efficiently.

The transmitter according to the invention is characterized in that said transmitter comprises a selector for in response to a detection result of a real-time requirement selecting a first coding scheme and a first modulation scheme for coding and modulating said packet data and for in response to a non-real-time requirement selecting a second coding scheme and a second modulation scheme for coding and modulating said packet data.

Said selector selects the coding scheme and the modulation scheme for coding and modulating said packet data dependently upon said packet data having a real-time or non-real-time requirement. As a result, for different requirements, the best coding scheme and modulation scheme can be chosen per requirement.

The invention is based upon an insight, inter alia, that packet data having real-time requirements and packet data having non-real-time requirements should be treated differently, and is based upon a basic idea, inter alia, that these different requirements can be detected, with the detection result defining the best coding scheme and modulation scheme.

The invention solves the problem, inter alia, of providing a transmitter as defined in the preamble which uses channels more efficiently, and is advantageous, inter alia, in that packet data is transmitted at improved efficiency.

Said detector and said selector for example form part of a processor system. Said packet data comprises one (art of a) packet or more (parts of) packets etc., and said coding scheme and modulation scheme are selected per time slot or group of time slots or (part of a) frame etc. The real-time requirements and non-real-time requirements can for example be detected by detecting the kind of traffic to which said packet data belongs, like for example audio, video, data etc.

A first embodiment of the transmitter according to the invention as defined in claim 2 is advantageous in that said first coding scheme comprises a convolutional code and said first modulation scheme comprises an adaptive orthogonal frequency division modulation scheme and said second coding scheme comprises a turbo code and said second modulation scheme comprises an orthogonal frequency division modulation scheme.

Said convolutional code and adaptive orthogonal frequency division modulation scheme allow the transmission of packet data having real-time requirements with improved efficiency, and said turbo code and orthogonal frequency division modulation scheme allow the transmission of packet data having non-real-time requirements with improved efficiency.

Orthogonal Frequency Division Modulation or OFDM is a multi-carrier modulation scheme, in which each sub-carrier is modulated with a M-Quadrature Amplitude Modulation or M-QAM. If M has the same value for every sub-carrier it is a standard OFDM. If M can adaptively vary sub-carrier per sub-carrier it is an Adaptive OFDM or AOFDM. Due to the performance of turbo codes+OFDM and the performance of turbo codes+AOFDM being rather similar, turbo codes should be used in combination with standard OFDM. Turbo codes cause delays, that's why under real-time requirements the convolutional codes are to be used.

A second embodiment of the transmitter according to the invention as defined in claim 3 is advantageous in that a further detection result comprises a target bit error rate and/or a payload bit rate.

Said detection of the target bit error rate and/or of the payload bit rate is used to advantageously improve/adapt said coding scheme and/or modulation scheme. The real-time/non-real-time requirements and the target bit error rate and the payload bit rate all belong to the collection of quality-of-service parameters or QoS parameters, together with for example the maximum delay and the maximum time jitter etc. So, generally, a first QoS parameter is detected for making a first selection, and a second QoS parameter is detected for making a second selection etc.

A third embodiment of the transmitter according to the invention as defined in claim 4 is advantageous in that said transmitter comprises a further detector for detecting channel conditions.

Said detection of the channel conditions like for example the signal to noise ratio level or SNR level is used to advantageously improve/adapt said coding scheme and/or modulation scheme. In case of stable channel conditions, said improving/adapting could be done less, and in case of unstable channel conditions, said improving/adapting should be done more often.

A fourth embodiment of the transmitter according to the invention as defined in claim 5 is advantageous in that said transmitter comprises a processor system for running an algorithm.

Said algorithm will improve/adapt said coding scheme and/or modulation scheme and/or will support the detecting of channel conditions and/or process the channel conditions.

A fifth embodiment of the transmitter according to the invention as defined in claim 6 is advantageous in that said algorithm comprises a rate adaptive algorithm for evaluating a maximum available bit rate in dependence of said channel conditions.

Said maximum available bit rate indicates the maximum number of bits per time slot or group of time slots or (part of a) frame etc. The maximum number of bits is computed through a rate adaptive algorithm because the objective is to find the maximum number of bits that can be transmitted under the given channel conditions. The inputs for this algorithm are for example the signal to noise ratio level or SNR level per subcarrier, and the transmission power. The output for this algorithm is for example the maximum modulation order per subcarrier.

A sixth embodiment of the transmitter according to the invention as defined in claim 7 is advantageous in that said algorithm further comprises a margin adaptive algorithm for computing a bit loading in dependence of an actual bit rate.

Said bit loading is calculated or not (by keeping the previous bit loading) dependently upon the channel conditions. Said actual bit rate indicates the actual number of bits per time slot or group of time slots or (part of a) frame etc. This actual number will generally be smaller than said maximum number due to segmentation rules. The bit loading is computed through a margin adaptive algorithm because the objective is to minimize the transmission power for the already known number of bits under the given channel conditions. The inputs for this algorithm are for example the signal to noise ratio level or SNR level per subcarrier, and total number of bits to be transmitted. The output for this algorithm is for example the modulation order per subcarrier.

A seventh embodiment of the transmitter according to the invention as defined in claim 8 is advantageous in that said transmitter comprises a code rate adapter for in response to a detection result of a real-time requirement and to a further detection result of a target bit error rate adapting a code rate for said computing.

Said code rate is adapted to approach said target bit error rate. After that, said bit loading can be computed, and code parameters can be set. The code rate adapter may form part of said processor system.

An eighth embodiment of the transmitter according to the invention as defined in claim 9 is advantageous in that said transmitter comprises a generator for in response to a detection result of a non-real-time requirement and to a further detection result of a target bit error rate generating a code rate and/or a block length and/or a number of iterations and/or code parameters.

Said code rate and/or block length and/or number of iterations form an optimum set generated via for example a look up table or a memory etc. and will imply a processing time smaller than a maximum tolerable delay. After that, said code parameters can be set. The generator may form part of said processor system.

Embodiments of the processor system according to the invention, of the method according to the invention and of the processor program product according to the invention correspond with the embodiments of the transmitter according to the invention.

These and other aspects of the invention will be apparent from and elucidated with reference to the embodiments(s) described hereinafter.

Figure 2:
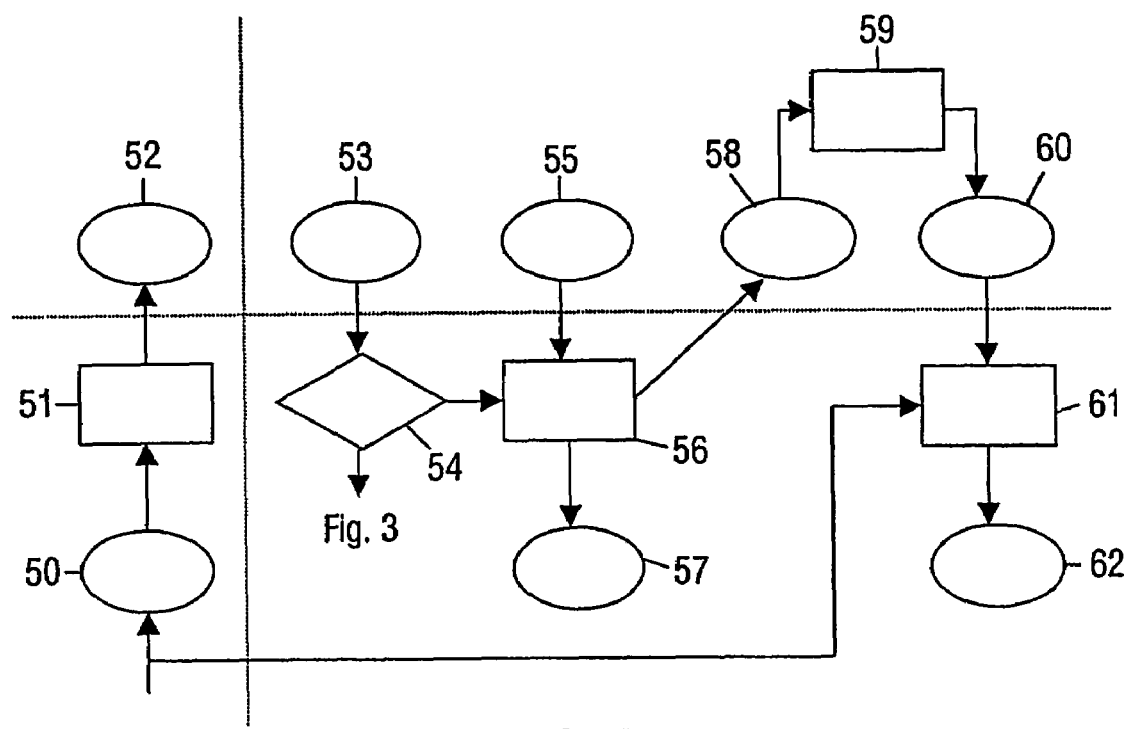
Figure 3:
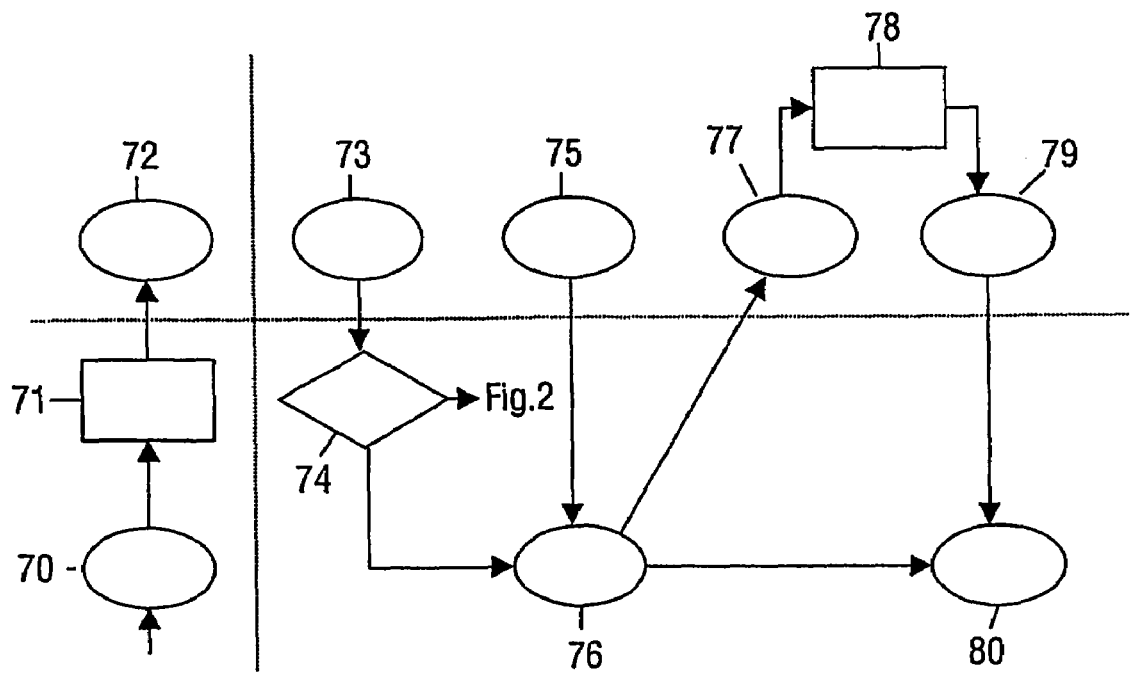

FIG. 1 illustrates in block diagram form a transmitter according to the invention comprising a processor system according to the invention, FIG. 2 illustrates a flow chart of a method according to the invention for the real-time situation, and FIG. 3 illustrates a flow chart of a method according to the invention for the non-real-time situation.

The transmitter according to the invention forms part of a transceiver 1 comprising an antenna interface 2 like for example a switch and/or a duplexer etc. of which an in/output is coupled to an antenna and of which an output is coupled to an input of a first receiving interface 3 like for example an amplifier and/or a filter etc. of which an output is coupled to inputs of a first demodulator 4 and of a second demodulator 5. An input of antenna interface 2 is coupled to an output of a first transmitting interface 6 like for example an amplifier and/or a filter etc., of which an input is coupled to outputs of a first modulator 7 and of a second modulator 8.

Transceiver 1 further comprises a connector interface 9 of which an in/output is to be coupled to an external unit like for example a personal computer etc. and of which an output is coupled to an input of a second receiving interface 10 like for example an amplifier and/or a filter and/or a demodulating unit and/or a decoding unit etc. An input of connector interface 9 is coupled to an output of a second transmitting interface 11 like for example an amplifier and/or a filter and/or a modulating unit and/or a coding unit etc.

Transceiver 1 further comprises a processor system 20 comprising a first decoder 21 of which an input is coupled to an output of first demodulator 4 and of which an output is coupled to an input of second transmitting device 11. Processor system 20 further comprises a second decoder 22 of which an input is coupled to an output of second demodulator 5 and of which an output is coupled to an input of second transmitting device 11. Processor system 20 also comprises a first coder 24 of which an input is coupled to an output of second receiving device 10 and of which an output is coupled to an input of first modulator 7, and comprises a second coder 25 of which an input is coupled to an output of second receiving device 10 and of which an output is coupled to an input of second modulator 8. Processor system 20 comprises a memory 23, a communication interface 26 to be coupled to for example a man-machine-interface like for example a keyboard, a display, a microphone, loudspeakers etc., and a controller 30.

Controller 30 comprises a processor 31 coupled to a coupler 39 like for example a switch or a bus system, and comprises a first detector 32, a second detector 33 and a selector 34 all coupled to coupler 39. Controller 30 further comprises a first coding interface 35 located between a control in/output of first coder 24 and coupler 39, a second coding interface 36 located between a control in/output of second coder 25 and coupler 39, a first decoding interface 37 located between a control in/output of first decoder 21 and coupler 39, and a second decoding interface 38 located between a control in/output of second decoder 22 and coupler 39. Coupler 39 is further coupled to memory 23, to communication interface 26, to outputs of decoders 21 and 22 and the input of second transmitting device 11, to the output of second receiving device 10 and the inputs of coders 24 and 25, and to control in/outputs of demodulators 4 and 5, of antenna interface 2, and of modulators 7 and 8.

First coding interface 35 for example comprises a code rate adapter for in response to a detection result of a real-time requirement and to a further detection result of a target bit error rate adapting code rates, and second coding interface 36 for example comprises a generator for in response to a detection result of a non-real-time requirement and to a further detection result of a target bit error rate generating code rates and/or block lengths and/or numbers of iterations and/or code parameters.

The transceiver 1 functions as follows. Packet data arriving at said antenna flows via antenna interface 2 and first receiving interface 3 to (one of) said demodulators 4,5 for demodulation purposes and to (one of) said decoders 21,22 for decoding purposes, under control of controller 30 (processor 31). Then, demodulated and decoded data flows via coupler 39 to second detector 33 for detecting channel conditions and possibly either flows via coupler 39 to processor 31 for controlling purposes or to communication interface 26 for communication purposes and/or flows via second transmitting interface 11 to connector interface 9 for external purposes.

Packet data arriving via connector interface 9 flows via second receiving interface 10 and coupler 39 to first detector 32 and/or packet data originating from the man-machine-interface arrives at communication interface 26 and flows via coupler 39 to first detector 32, under control of processor 31, and is detected by first detector 32.

In response to a first detection result of a real-time requirement, selector 34 will select first coder 24 and first modulator 7 to be used for coding and modulation purposes. First coder 24 codes in accordance with a first coding scheme comprising a convolutional code and first modulator 7 modulates in accordance with a first modulation scheme comprising an adaptive orthogonal frequency division modulation scheme (AOFDM). Said convolutional code and adaptive orthogonal frequency division modulation scheme allow the transmission of packet data having real-time requirements with improved efficiency.

In response to a second detection result of a non-real-time requirement, selector 34 will select second coder 25 and second modulator 8 to be used for coding and modulation purposes. Second coder 25 codes in accordance with a second coding scheme comprising a turbo code and second modulator 8 modulates in accordance with a second modulation scheme comprising an orthogonal frequency division modulation scheme (OFDM). Said turbo code and orthogonal frequency division modulation scheme allow the transmission of packet data having non-real-time requirements with improved efficiency.

Preferably, first detector 32 further detects a target bit error rate and/or a payload bit rate, to be able to improve/adapt said coding scheme and/or modulation scheme.

Processor system 20, in particular controller 30 and memory 23, more in particular processor 31 and memory 23, can be used for running algorithms for improving/adapting said coding scheme and/or modulation scheme and/or for supporting the detecting of channel conditions and/or processing the channel conditions.

A first algorithm comprises a rate adaptive algorithm for evaluating a maximum available bit rate in dependence of said channel conditions. Said maximum available bit rate indicates the maximum number of bits per time slot or group of time slots or (part of a) frame etc. The inputs for this first algorithm are for example the signal to noise ratio level or SNR level per subcarrier, and the transmission power. The output for this algorithm is for example the maximum modulation order per subcarrier.

A second algorithm comprises a margin adaptive algorithm for computing a bit loading in dependence of an actual bit rate. Said bit loading is calculated or not (by keeping the previous bit loading) dependently upon the channel conditions. Said actual bit rate indicates the actual number of bits per time slot or group of time slots or (part of a) frame etc. This actual number will generally be smaller than said maximum number due to segmentation rules. The inputs for this second algorithm are for example the signal to noise ratio level or SNR level per subcarrier, and total number of bits to be transmitted. The output for this algorithm is for example the modulation order per subcarrier.

Said rate/margin adaptive algorithm and said (A)OFDM are of common general knowledge to a person skilled in the art.

Via code rate adapter 35, in response to a detection result of a real-time requirement and to a further detection result of a target bit error rate, a code rate is adapted for said computing, to approach said target bit error rate. After that, said bit loading can be computed, and code parameters can be set.

Via generator 36, in response to a detection result of a non-real-time requirement and to a further detection result of a target bit error rate, one or more code rates and/or one or more block lengths and/or one or more numbers of iterations and/or one or more code parameters are generated. Said code rate and/or block length and/or number of iterations form an optimum set generated via for example a look up table or a memory etc. and will imply a processing time smaller than a maximum tolerable delay. After that, said code parameters can be set.

The blocks in FIG. 2 have the following meaning:
Block 50: Detect the channel conditions.
Block 51: Compute M (max. number of bits) through a rate adaptive algorithm.
Block 52: Define M.
Block 53: Detect real-time/non-real-time requirement.
Block 54: Real-time ? Go to 56. Non-real-time ? Go to FIG. 3.
Block 55: Detect target bit error rate.
Block 56: Improve code rate in order to approach target bit error rate.
Block 57: Set code rate for branch 1 (real-time).
Block 58: Define code rate.
Block 59: Evaluate N (actual number of bits) in view of M.
Block 60: Define N.
Block 61: Compute the loading through a margin adaptive algorithm or keep the old loading respectively dependently upon unstable or stable conditions respectively.
Block 62: Set loading for branch 1 (real-time).

In FIG. 2, the part above the dotted line is a so-called Media Access Controller or MAC part, and the part below this dotted line is a so-called physical layer PHY. The part left of the dotted line is a receiving part for example at frame rate (for example for every packet received), and the part right from this dotted line is a transmitting part for example for every portion of a frame.

The blocks in FIG. 3 have the following meaning:
Block 70: Detect the channel conditions.
Block 71: Compute M (max. number of bits) through a rate adaptive algorithm.
Block 72: Define M.
Block 73: Detect real-time/non-real-time requirement.
Block 74: Real-time ? Go to FIG. 2. Non-real-time ? Go to 76.
Block 75: Detect target bit error rate.
Block 76: Generate the values for code rate(s), block length(s), number(s) of iterations, select an optimum set.
Block 77: Define code rate.
Block 78: Evaluate N (actual number of bits) in view of M.
Block 79: Define N.
Block 80: Set code rate for branch 2 (non-real-time).

In FIG. 3, the part above the dotted line is a so-called Media Access Controller or MAC part, and the part below this dotted line is a so-called physical layer PHY. The part left of the dotted line is a receiving part for example at frame rate (for example for every packet received), and the part right from this dotted line is a transmitting part for example for every slot group.

FIGS. 1, 2 and 3 just show embodiments and do not exclude alternatives and/or possibilities not shown and/or mentioned. For example in FIG. 1, detectors 32 and 33 and selector 34 may be partly or entirely combined and may be 100% software, 100% hardware or a mixture of both. Said coders 24 and 25 and rate adapter 35 and generator 36 may be partly or entirely combined and may be 100% software, 100% hardware or a mixture of both. Said decoders 21 and 22 and decoding interfaces may be partly or entirely combined and may be 100% software, 100% hardware or a mixture of both. Modulators 7 and 8 may be partly or entirely combined and may be made adaptable, and demodulators 4 and 5 may be partly or entirely combined and may be made adaptable. Further, each block shown can be separated into subblocks. Other blocks are not to be excluded.

For example in FIGS. 2 and 3, each block may be a (sub)step in the method according to the invention and may be a (sub)function in the processor program product according to the invention. Each two blocks can be combined, especially per section (with both dotted lines creating four sections), and each block shown can be separated into subblocks. Again, other blocks (other substeps and subfunctions) are not to be excluded.

So, many alternatives and/or possibilities can be made without departing from the scope of this invention.

The invention claimed is:

1. Transmitter for transmitting packet data and comprising a detector for detecting packet data to be transmitted, characterized in that said transmitter comprises a selector for in response to a detection result of a real-time requirement selecting a first coding scheme and a first modulation scheme for coding and modulating said packet data and for in response to a non-real-time requirement selecting a second coding scheme and a second modulation scheme for coding and modulating said packet data, wherein said first coding scheme comprises a convolutional code and said first modulation scheme comprises an adaptive orthogonal frequency division modulation scheme and said second coding scheme comprises a turbo code and said second modulation scheme comprises an orthogonal frequency division modulation scheme.

2. Transmitter according to claim 1, characterized in that a further detection result comprises a target bit error rate and/or a payload bit rate.

3. Transmitter according to claim 2, characterized in that said transmitter comprises a further detector for detecting channel conditions.

4. Transmitter according to claim 3, characterized in that said transmitter comprises a processor system for running an algorithm.

5. Transmitter according to claim 4, characterized in that said algorithm comprises a rate adaptive algorithm for evaluating a maximum available bit rate in dependence of said channel conditions.

6. Transmitter according to claim 5, characterized in that said algorithm further comprises a margin adaptive algorithm for computing a bit loading in dependence of an actual bit rate.

7. Transmitter according to claim 6, characterized in that said transmitter comprises a code rate adapter for in response to a detection result of a real-time requirement and to a further detection result of a target bit error rate adapting a code rate for said computing.

8. Transmitter according to claim 6, characterized in that said transmitter comprises a generator for in response to a detection result of a non-real-time requirement and to a further detection result of a target bit error rate generating a code rate and/or a block length and/or a number of iterations and/or code parameters.

9. Processor system for use in a transmitter for transmitting packet data and comprising a detector for detecting packet data to be transmitted, characterized in that said processor system comprises a selector for in response to a detection result of a real-time requirement selecting a first coding scheme and a first modulation scheme for coding and modulating said packet data and for in response to a non-real-time requirement selecting a second coding scheme and a second modulation scheme for coding and modulating said packet data, wherein said first coding scheme comprises a convolutional code and said first modulation scheme comprises an adaptive orthogonal frequency division modulation scheme and said second coding scheme comprises a turbo code and said second modulation scheme comprises an orthogonal frequency division modulation scheme.

10. Method for transmitting packet data and comprising the step of detecting packet data to be transmitted, characterized in that said method comprises the step of in response to a detection result of a real-time requirement selecting a first coding scheme and a first modulation scheme for coding and modulating said packet data and of in response to a non-real-time requirement selecting a second coding scheme and a second modulation scheme for coding and modulating said packet data, wherein said first coding scheme comprises a convolutional code and said first modulation scheme comprises an adaptive orthogonal frequency division modulation scheme and said second coding scheme comprises a turbo code and said second modulation scheme comprises an orthogonal frequency division modulation scheme.

11. Processor program product for use in a transmitter for transmitting packet data and comprising the function of detecting packet data to be transmitted, characterized in that said processor program product comprises the function of in response to a detection result of a real-time requirement selecting a first coding scheme and a first modulation scheme for coding and modulating said packet data and of in response to a non-real-time requirement selecting a second coding scheme and a second modulation scheme for coding and modulating said packet data, wherein said first coding scheme composes a convolutional code and said first modulation scheme comprises an adaptive orthogonal frequency division modulation scheme and said second coding scheme comprises a turbo code and said second modulation scheme comprises an orthogonal frequency division modulation scheme.

* * * * *